United States Patent [19]

Patton

[11] Patent Number: 4,999,025
[45] Date of Patent: Mar. 12, 1991

[54] VISCOSITY-MODIFIERS FOR AQUEOUS-BASED DYE-DEPLETION PRODUCTS

[75] Inventor: Robert T. Patton, Lake Jackson, Tex.

[73] Assignee: The Dow Chemical Company, Midland, Mich.

[21] Appl. No.: 212,403

[22] Filed: Jun. 27, 1988

[51] Int. Cl.$^5$ .......................... D06L 3/02; D06L 3/04
[52] U.S. Cl. ............................................ 8/111; 8/101; 8/102; 8/108.1
[58] Field of Search ................ 8/101, 102, 107, 108.1, 8/111, 109, 110; 252/186.26, 186.27, 187.25, 187.26, 188.22

[56] References Cited

U.S. PATENT DOCUMENTS 4,392,979 7/1983 Lee et al. ............................ 252/184

FOREIGN PATENT DOCUMENTS 0207811 1/1987 European Pat. Off. .

Primary Examiner—Paul Lieberman
Assistant Examiner—John F. McNally

Attorney, Agent, or Firm—W. J. Lee

[57] ABSTRACT

Aqueous-based dye-depletion formulations such as bleaches, oxidizing agents or reducing agents are thickened or viscosity-modified by the addition of at least a small, but effective, amount of at least one crystalline mixed metal hydroxide conforming substantially to the formula

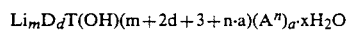

$$Li_m D_d T(OH)_{(m+2d+3+n \cdot a)}(A^n)_a \cdot xH_2O$$

where m is zero to one, D is a divalent metal, d is from zero to 4, T is a trivalent metal, A represents at least one anion or negative-valence radical of valence n, where n is 1 or more, $(m+2d+3+n \cdot a)$ is equal to or greater than 3, $(m+d)$ is greater than zero, and $xH_2O$ represents excess waters of hydration.

The dye-depletion formulations have highly beneficial gel-thinning and gel-setting properties which render it capable of being used in pattern-dying, pattern-bleaching, and the like.

20 Claims, No Drawings

VISCOSITY-MODIFIERS FOR AQUEOUS-BASED DYE-DEPLETION PRODUCTS

FIELD OF THE INVENTION

Thickeners or viscosity-modifiers for aqueous-based dye-depletion products are disclosed.

BACKGROUND OF THE INVENTION

As used in this disclosure, the term "dye-depletion" refers to the bleaching, fading, altering, diluting, solvating, oxidizing, or other effect upon a dyed article or substrate wherein a dye-depletion reagent is used in changing the appearance of the dye (or other colorant) in the location where the reagent is applied.

As used in this disclosure, the term "dye-depletion reagent" refers to such things as bleaches, oxidizers, reducers, solvents, or any chemicals or chemical formulations which are used in changing the appearance, color, amount, effect or concentration of a dye, pigment, colorant, or other such visually significant additive in or on a cloth, fabric, leather, wood, or paper or other pulp product, whether or not it is of a woven, non-woven, sheeted, fibrous, or compressed form.

Thickeners or other viscosity-modifiers are often used in aqueous-based functional products, e.g. household products, commercial products, cleansers, disinfectants, bleaches, and the like and in personal care products, such as soaps, lotions, face creams, hand creams, toothpaste, and the like. Thickeners that have been used in these applications include such things as natural and synthetic water-sensitive organic polymers, or other water-sensitive organic substances. Also, inorganic substances, such as natural clays, refined clays, synthetic clay-like materials, silicates, and aluminates have been used.

Natural clays and refined natural clays may vary from one mining location to another and the performance obtained with one batch may not exactly match the performance of another batch; the color may not match and the effect on viscosity may not match. The natural clays, and even refined natural clays, may contain impurities which can produce non-uniformity among batches and may create side-reactions with other ingredients in a formulation to which the clay is added. Clays are normally anionic and can react with ingredients which are cationic, such as cationic surfactants used as fabric softeners.

Polymers or other organic thickeners are often subject to microbial attack and may lose their effectiveness if not protected with a preservative. Some polymers do not typically have a true yield point which is required to indefinitely suspend solids. Many of the polymeric thickeners also contain functional groups which are adversely attacked by the chemicals in bleaches or other formulations, and this can cause a loss or diminishment of either the desired viscosity control or the effectiveness of the chemical.

SUMMARY OF THE INVENTION

It has now been found that certain mixed metal hydroxides, which are of layered crystalline structures exhibiting cationic surface charges, are beneficially employed as thickeners or viscosity-modifiers in various aqueous-based dye-depletion products, such as bleaches and oxidants. For purposes of conciseness, the expression "MMOH" will be used in this disclosure to refer to the mixed metal hydroxides which are described in detail below. The inorganic MMOH compounds are resistant to microbial attack, are cationic (which prevents interaction with cationic ingredients used in many of the formulations), and, since they are synthetic, can be made substantially of consistent quality and purity.

The crystalline mixed metal hydroxides (MMOH) used in the present invention conform substantially to the empirical formula $$Li_m D_d T(OH)_{(m+2d+3+n\cdot a)}(A^n)_a \cdot xH_2O$$

where m is an amount of Li of from zero to one,
where D represents at least one divalent metal cation and d is an amount of from about zero to about 4,
where T represents at least one trivalent metal cation,
where A represents at least one monovalent or polyvalent anion or negative-valence radical,
a is an amount of A ions of valence n, with n·a being an amount of from about zero to about −3,
where (m+2d+3+n·a) is equal to or more than 3,
where m+d is greater than zero, and
where $xH_2O$ represents excess waters of hydration, with x being zero or more. (By "excess waters of hydration" it is meant that there is more water associated with the compound than is needed to supply the amount of hydroxyl ions required in the crystal formula.)

In the above formula, it should be noted that n, being the valence of the anion or negative-valence radical, is a negative number; thus n·a is a negative number.

These crystalline mixed metal hydroxides are found to be beneficial as thickeners or viscosity-modifiers for aqueous-based dye-depletion products, such as bleaches, oxidants, whiteners, color-extractants, reducing agents, and inorganic bases.

In one aspect, the present invention is perceived as being a formulation of the type described having incorporated therein the MMOH compounds.

In another aspect, the present invention is perceived as a means, method, or process for providing viscosity-modifiers or thickeners to the dye-depletion formulations by incorporating therein the MMOH compounds.

A further aspect is that MMOH compounds provide a thickened product which thins readily under even very slight shear, but which rethickens ("gels") rapidly when the shear is stopped. The gelation rate is perceived as being essentially immediate.

In yet another aspect, the present invention is perceived as a method for dye-depletion by the application of the dye-depletion formulations which contain beneficial quantities of the MMOH compounds.

DETAILED DESCRIPTIONS INCLUDING BEST MODE

The MMOH compounds useful in the present invention are preferably those of the monodispersed, monolayer variety such as described in copending Ser. No. 060,133 filed June 9, 1987 and in U.S. Pat. No. 4,664,843, but can also be of the varieties disclosed in U.S. Pat. Nos. 4,477,367; 4,446,201; 4,392,979; and 4,461,714 and the like. For the most part the MMOH compounds are prepared by the general process of forming a solution of compounds of the subject metals under certain conditions whereby a soluble alkaline material, e.g. ammonia or caustic, reacts with the soluble metal compounds to produce the layered crystals of mixed metal hydroxides. However in the present invention, it is often best to avoid having ammonia in the product, in which case another alkaline material, especially NaOH or KOH is used. The MMOH may be used as a slurry of varied solids content, or dry.

The dye-depletion reagents include, but are not limited to metal hypochlorites and metal permanganates, such as those which contain alkali metals or alkaline earth metals such as, sodium hypochlorite, lithium hypochlorite, calcium hypochlorite, sodium permanganate, potassium permanganate, lithium permanganate, and the like.

The dye-depletion reagents also include, but are not limited to halates, halites, peroxides, and the like and include, for example, sodium chlorite, sodium chlorate, hydrogen peroxide, sodium hydrosulfite, sodium perborate, sodium peroxide, sulfur dioxide, sodium borohydride, thiourea dioxide, chlorine dioxide, potassium iodate, and the like.

The dyed, stained, tinted, pigmented, or otherwise colored articles, substances or substrates include, but are not limited to fiber, yarn, thread, rope, sliver, tone, roving, and fabric of either natural or synthetic origin and the like. This includes articles, substances or substrates which may be dyed or otherwise provided with color by using, for example, a dye or colorant administered via direct, sulfur, naphthol, fiber reactive, vat, disperse, acid, indigo, azoic, and basic dyes and the like.

Methods of applying the MMOH-modified dye-depletion reagents to the colored articles or substrates includes, but is not limited to dipping, padding, screening, roll printing, saturating (such as in a Beck dyeing machine or in a jet dyeing machine), or tumbling with pumice stones or the like in a garment bleaching machine.

The process of using MMOH compounds to thicken aqueous-based dye-depletion products includes, but is not limited to the following two general ways. One method, in general, involves the activation of the MMOH particles by an electrolyte. In this process, the MMOH is first dispersed by using high shear, sonic waves or other methods known in the art to produce a high degree of dispersion of agglomerated particles. Once the material is dispersed in aqueous or partially aqueous media, a salt (electrolyte) is added either predissolved or dry and mixing/or shearing is continued until a smooth, thickened system is obtained. Other ingredients may be blended into the prethickened material. Often, one or more of the ingredients is a salt and a separate activator is not needed. The salt used for activation can be almost any ionic substance but components containing organic anions or multivalent anions such as $CO_3-2$, $PO_4-3$, $P_3O_{10}-5$ and the like are usually more effective.

The other general method involves interaction with other colloidal particles in such a manner that they are linked together through bridges or bonds formed by the MMOH. In these cases, it can be interpreted as forming an adduct with the other particles. This can produce an "extension" effect. This can happen, for instance, when fumed silica or a clay is also an ingredient and less material is needed for thickening. This can also occur when a normally soluble material is included in the formulation beyond the point of saturation such that very small or colloidal particles are present as crystals or agglomerates. In this case, the thickening occurs when the MMOH and other particles are sheared together and agglomerates are broken, exposing fresh faces which react.

As used in this disclosure, the expression "thickener" when used in reference to the effect of the MMOH additives, means that the apparent viscosity at ambient conditions and at little or no applied shear has been increased by the addition of the MMOH. The expression "viscosity-modifier" is used herein to refer to the effect obtained by the addition of the MMOH whether or not the effect on viscosity is evident at ambient conditions or at non-ambient conditions and whether or not the effect is a thickening effect apparent under no-stress conditions or under shear. For example, changing of a Newtonian liquid to a non-Newtonian liquid, or vice-versa, is one form of a viscosity modification. Changing the degree or extent of thixotropicity or dilatancy of a liquid is a form of viscosity modification.

The expression "mixed metal hydroxide" implies that there are at least two different metals in the hydrous oxide crystals. In the present invention, it is preferred that at least one of the metals is a trivalent metal, along with at least one other metal which can be either, or both, of the divalent or monovalent (Li) varieties. The amount of the A anion (or negative-valence radical) is that which substantially satisfies the valence requirements of the cations in the crystalline material.

In the above described formula, the trivalent metal cation is preferably Al, Fe, or Ga, and can be mixtures of any of these; Al is most preferred as the trivalent metal.

The divalent metal cation is preferably Mg, Ca, Mn, Fe, Co, Ni, Cu, or Zn and can be mixtures of any of these; Ca or Mg, especially Mg, is most preferred as the divalent metal.

The anion, A, can be monovalent, divalent, trivalent, or polyvalent, and is preferably at least one selected from the group consisting of hydroxyl, halide, sulfate, nitrate, phosphate, carbonate, glycolate, lignosulfate, and polycarboxylic or negative-valence radicals. Thus, the A anion can be inorganic or a hydrophilic organic group or mixture of different anions. Preferably the A anion is inorganic, such as OH— or a combination of anions, at least one of which is OH—.

The contents of the dye-depletion formulations that can be thickened or modified by the addition of MMOH compounds can be beneficially varied for various applications. Generally, the ingredients and levels of the ingredients which are in a given formulation have more to do with a desired effect other than simply that of thickening or viscosity-modification. The versatility of the MMOH compounds is beneficial in that it can be added to dye-depletion formulations for viscosity purposes without interfering with the other ingredients in their intended purpose. Substitutions, replacements, and/or eliminations of one or more of the components (other than the MMOH compound) usually has little effect on thickening or viscosity-modification.

The amount of the MMOH added to the aqueous-based dye-depletion formulation will usually be an amount in the range of about 0.03% to 10% or more depending somewhat on the temperature, on the particular formulation into which it is added, on which of the MMOH varieties is being used, and on the extent of thickening or viscosity-modification desired. Speaking in a general sense, it is preferable to use an amount in the range of about 0.5% to about 10%, with the range of about 3% to about 6% being most preferred. Generally, one would not expect amounts of MMOH of much less than about 0.03% to give an appreciable effect on thickening or viscosity-modification. Thus, an overall concentration range for the MMOH of about 0.03% to about 10% is anticipated as being a sufficient range in which to operate for most applications.

The dye-depletion formulations into which the MMOH compounds are incorporated are, for the most part, those which rely on water or some aqueous base as a carrier and to provide fluidity to the formulation.

In the following examples the expression "MAH" is in reference to certain compounds within the generic formula shown above and which conform substantially to the formula $MgAl(OH)_{5-y}Cl_y \cdot xH_2O$ and which are prepared from an aqueous solution containing $MgCl_2$ and $AlCl_3$ as taught, e.g., in U.S. Pat. No. 4,664,843 or in pending Ser. No. 060,133 filed June 9, 1987. The small amount of $Cl^-$ anion is a residual amount of the $Cl^-$ anion which was in the starting materials.

The following examples are given to illustrate applications of the MMOH in various dye-depletion formulations; however, the invention is not limited to only the examples illustrated.

EXAMPLE 1

Sodium hypochlorite solution is thickened for use in screen printing in accordance with the following recipe:

| Ingredient | Grams | Approx. % of Total |
|---|---|---|
| MAH slurry (12% MAH conc.) | 2416 | 48.3 |
| Na$_2$CO$_3$ | 225 | 4.5 |
| NaOCl (12.5% active Cl$_2$) | 2000 | 40.0 |
| Water | 359 | 7.2 |
| Totals: | 5000 | 100.0 |

In the above recipe, the MAH comprises about 5.8% of the total, and the active chlorine comprises about 5% of the total.

The NaOCl, the Na$_2$CO$_3$, and the water are mixed until all solubles are dissolved, and the solution is homogenous. This solution and the MAH are then pumped simultaneously through and in-line mixer at high shear conditions. The resulting mixture is free of lumps and 100% will pass through a screen mesh (about 100 mesh, U.S. standard sieve size).

The following rheological data is obtained at ambient laboratory temperature after 8 weeks using a Brookfield Model RV* viscosimeter (*a trademark) having a #6 spindle.

| RPM: | 0.5 | 1.0 | 2.5 | 5.0 | 10 | 20 | 50 | 100 |
|---|---|---|---|---|---|---|---|---|
| Visc.** | 296 | 123 | 43.2 | 27.2 | 24.6 | 12.3 | 6.4 | 3.35 |

(**viscosity, cps × 1000)

With this viscosity and yield point, this thickened bleach is easily pumped through a typical print paste feed system to a print roll, and is easily screened through the roll. Once in moistened fabric, the bleach is immobilized by the rapid gellation and provides minimal migration and bleed.

EXAMPLE 2

Commercially available Kandu* laundry bleach (*a trademark) is thickened in accordance with the following recipe:

| Ingredient | Grams | Approx. % of Total |
|---|---|---|
| MAH slurry (12% MAH conc.) | 418 | 20.9 |
| Na$_2$CO$_3$ | 90 | 4.5 |
| Bleach (5.25% NaOCl) | 1229 | 61.45 |
| Water | 263 | 13.15 |
| Totals: | 2000 | 100 |

(In the above recipe, the MAH comprises about 2.5% of the total and the NaOCl comprises about 3.23% of the total.)

The MAH, Na$_2$CO$_3$ and water are mixed until the solubles are dissolved and a smooth paste is obtained. The thickened paste is allowed to set for several minutes and the NaOCl solution is added slowly with blending until the mixture is smooth.

The following rheological data are obtained at ambient laboratory temperature using a Brookfield Model RV* viscosimeter (*a trademark):

| RPM: | 0.5 | 1.0 | 2.5 | 5.0 | 10 | 20 | 50 | 100 |
|---|---|---|---|---|---|---|---|---|
| Visc.** | 26.7 | 19.7 | 12.5 | 7.1 | 3.9 | 2.2 | 1.0 | 0.5 |

(**viscosity, cps × 1000)

Thus is it shown that a small percent of the MAH thickens the bleach solution, but it thins easily when shear is applied. The thickened bleach solution can be applied to a print roll where it quickly re-gels and does not run off rapidly, but it is easily transferred to print fabric where, with its high yield point, the bleach is immobilized and gives minimal migration.

EXAMPLE 3

Potassium permanganate for use in garment finishing is thickened in accordance with the following recipe:

| Ingredient | Grams | Approx. % of Total |
|---|---|---|
| MAH slurry (12% MAH conc.) | 2417 | 48.3 |
| KMnO$_4$ | 250 | 5.0 |
| Water | 2333 | 46.7 |
| Totals: | 5000 | 100 |

(In the above recipe, the MAH comprises about 5.8% of the total.)

The MAH, KMnO$_4$ and water are mixed until all solubles are dissolved and a smooth paste is obtained on a Hobart* blender (*a trademark). The resulting product is visually lump free. This product gives excellent results in bleaching moistened denim garments (in this instance blue jean pants) using pumice stones in a garment dyeing machine.

The following rheological data are obtained at ambient laboratory temperature using a Brookfield Model RV* viscosimeter (*a trademark):

| RPM: | 0.5 | 1.0 | 2.5 | 5.0 | 10 | 20 | 50 | 100 |
|---|---|---|---|---|---|---|---|---|
| Visc.** | 328 | 137 | 48 | 24.2 | 19.3 | 13.2 | 6.5 | 3.05 |

(**viscosity, cps × 1000)

Thus a randomly patterned material is produced by the dye-reduction process. The process can be applied to the material either before or after being made into a garment.

EXAMPLE 4

In similar manner to the above laundry bleach example, thickened bleaches are prepared by using more MAH and/or by using greater concentrations of NaOCl. Furthermore, other oxidizing or reducing agents are similarly thickened, such as $KMnO_4$, $NaClO_3$, or $Na_2SO_3$ and the like, using MAH or other MMOH compounds.

EXAMPLE 5

The MMOH-thickened dye-depletion formulations, when applied to pieces of sponge, ceramic beads, stones or particles, or other porous or high surface area non-porous carriers are effective in causing the dye-depletion reagent to be applied to the dyed moistened substrate (such as cotton cloth) at the points of contact of the sponge (or other porous material) with the substrate, and the formulation does not "run" onto other portions of the substrate. Thus the dye-depletion reagent only affects the dye in the places where the fast-gelling formulation is applied by the sponge or other carrier.

We claim:

1. A method for dye-depletion of a material, selected from the group consisting of cloth, fabric, leather, wood, paper and other pulp product said method comprising contacting the material with an aqueous-based dye-depletion reagent in a manner, and for a period of time, whereby at least a portion of the material is affected by the dye-depletion reagent as evidenced by a change of color in the area in which the dye-depletion reagent is brought into contact with the material, said dye-depletion reagent being thickened or viscosity-modified by the presence therein of an effective amount of at least one monodisperse, monolayer, crystalline mixed metal hydroxide compound conforming essentially to the formula $$Li_m D_d T(OH)_{(m+2d+3+n\cdot a)}(A^n)_a \cdot xH_2O$$

where m is from zero to one,

D is a divalent metal and d represents the amount of D,

T is at least one trivalent metal,

A represents at least one monovalent or polyvalent anion or negative-valence radical, a is an amount of A ions of valence n, with n·a being an amount of from about zero to about −3, (m+2d+3+n·a) is equal to or more than 3, (m+d) is greater than zero, and $xH_2O$ represents excess waters of hydration, with x being zero or more, said reagent being characterized by being a thickened product which thins readily under shear, but which gels essentially immediately when shear is stopped.

2. The method of claim 1, wherein the dye-depletion reagent is a bleach.

3. The method of claim 1, wherein the dye-depletion reagent is a reducing agent.

4. The method of claim 1 wherein the dye-depletion reagent is sodium hypochlorite.

5. The method of claim 1 wherein the dye-depletion reagent is potassium permangnate.

6. The method of claim 1 wherein the dye-depletion reagent is hydrogen peroxide.

7. The method of claim 1 wherein the dye-depletion reagent is chlorine dioxide.

8. The method of claim 1 wherein the dye-depletion reagent is sodium hydrosulfite.

9. The method of claim 1 wherein the M metal is at least one selected from the group consisting of Mg, Ca, Mn, Fe, Co, Ni, Cu, and Zn.

10. The method of claim 1 wherein the M metal is at least one of the group consisting of Ca and Mg.

11. The method of claim 1 wherein the T metal is at least one selected from the group consisting of Al, Fe, and Ga.

12. The method of claim 1 wherein the T metal is Al.

13. The method of claim 1 wherein m is zero, d is one, and an is an amount in the range of zero to one.

14. The method of claim 1 wherein A represents at least one inorganic anion or negative-valence radical.

15. The method of claim 1 wherein A represents a hydrophilic organic negative-valence group.

16. The method of claim 1 wherein the A anion represents at least one of the group consisting of hydroxyl, halide, sulfate, nitrate, phosphate, carbonate, glycolate, lignosulfate, and polycarboxylic or negative-valence radicals.

17. The method of claim 1, wherein the mixed metal hydroxide is $MgAl(OH)_{(5+n\cdot a)}A_a^n \cdot xH_2O$, where n·a is an amount of from zero to one, where A is an anion other than OH— and $xH_2O$ is an indefinite amount of excess waters of hydration.

18. The method of claim 1 wherein the A anion is a halide.

19. The method of claim 1 wherein the A anion is chloride.

20. The method of claim 1 wherein the mixed metal hydroxide compound conforms essentially to the formula $$MgAl(OH)_{(5-n\cdot a)}(A^n)_a \cdot xH_2O$$

where A is chloride and n·a is an amount of from zero to one and x is zero or more.

* * * * *